US008566398B2

(12) United States Patent
Barnier et al.

(10) Patent No.: US 8,566,398 B2
(45) Date of Patent: Oct. 22, 2013

(54) WEB BASED EXTRANET ARCHITECTURE PROVIDING APPLICATIONS TO NON-RELATED SUBSCRIBERS

(75) Inventors: Brian Glen Barnier, Naperville, IL (US); Randy S. Mueller, LaGrange, IL (US); Thomas Terence Dean, Farmington Hills, MI (US); Richard T. Madrid, Tampa, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 52 days.

(21) Appl. No.: 13/294,484

(22) Filed: Nov. 11, 2011

(65) Prior Publication Data
US 2012/0060201 A1 Mar. 8, 2012

Related U.S. Application Data

(63) Continuation of application No. 10/744,961, filed on Dec. 23, 2003, now Pat. No. 8,082,300, which is a continuation of application No. 10/246,430, filed on Sep. 17, 2002, now Pat. No. 6,697,861, which is a continuation of application No. 09/187,556, filed on Nov. 6, 1998, now Pat. No. 6,453,348.

(51) Int. Cl.
*G06F 15/16* (2006.01)
(52) U.S. Cl.
USPC ............................ 709/204; 709/205; 709/206
(58) Field of Classification Search
USPC ................................................ 709/204–206
See application file for complete search history.

(56) References Cited

U.S. PATENT DOCUMENTS

| 5,051,822 | A | | 9/1991 | Rhoades |
| 5,329,619 | A | | 7/1994 | Page et al. |
| 5,586,312 | A | | 12/1996 | Johnson |
| 5,675,802 | A | | 10/1997 | Allen |
| 5,721,913 | A | | 2/1998 | Ackroff |
| 5,754,782 | A | | 5/1998 | Masada |
| 5,757,925 | A | | 5/1998 | Faybishenko |
| 5,771,354 | A | | 6/1998 | Crawford |
| 5,774,667 | A | * | 6/1998 | Garvey et al. ................. 709/222 |
| 5,779,549 | A | | 7/1998 | Walker |
| 5,790,127 | A | | 8/1998 | Anderson |
| 5,813,007 | A | | 9/1998 | Nielsen |
| 5,832,511 | A | | 11/1998 | Beck |
| 5,835,911 | A | | 11/1998 | Nakagawa |
| 5,845,090 | A | | 12/1998 | Collins |

(Continued)

OTHER PUBLICATIONS

"Ameritech Offers Online Bond Info", (PublicFinance.com Enables Local Governments to Provide Bond Information Online (Company Business and Marketing), located at https://www.thedacs.com/techs/abstract175495, 6 pages, retrieved Nov. 4, 2008.

(Continued)

*Primary Examiner* — Brian P Whipple
(74) *Attorney, Agent, or Firm* — Guntin & Gust, PLC; Jay H. Anderson (57) ABSTRACT

An extranet includes a network which couples a plurality of non-related participants and a server coupled to the network. The server stores a plurality of applications including workgroup applicants, transaction applications, security applications and transport circuits and equipment. The server is programmed to load particular ones of the plurality of applications onto the network for use by the plurality of participants in response to a request by one of the participants for a particular application.

20 Claims, 5 Drawing Sheets

(56) References Cited

U.S. PATENT DOCUMENTS

| | | | |
|---|---|---|---|
| 5,852,809 A | 12/1998 | Abel | |
| 5,862,325 A | 1/1999 | Reed | |
| 5,862,346 A | 1/1999 | Kley | |
| 5,884,035 A * | 3/1999 | Butman et al. | 709/218 |
| 5,925,127 A | 7/1999 | Ahmad | |
| 5,946,464 A | 8/1999 | Kito | |
| 5,963,207 A | 10/1999 | Brewer | |
| 5,970,475 A | 10/1999 | Barnes | |
| 6,014,651 A | 1/2000 | Crawford | |
| 6,015,344 A | 1/2000 | Kelly | |
| 6,032,118 A | 2/2000 | Tello | |
| 6,035,423 A | 3/2000 | Hodges | |
| 6,061,796 A | 5/2000 | Chen | |
| 6,076,105 A | 6/2000 | Wolff | |
| 6,088,796 A | 7/2000 | Cianfrocca | |
| 6,098,054 A | 8/2000 | McCollom | |
| 6,115,040 A | 9/2000 | Bladow | |
| 6,119,149 A * | 9/2000 | Notani | 709/205 |
| 6,131,120 A * | 10/2000 | Reid | 709/225 |
| 6,167,433 A | 12/2000 | Maples | |
| 6,185,551 B1 | 2/2001 | Birrell | |
| 6,199,204 B1 | 3/2001 | Donohue | |
| 6,205,147 B1 | 3/2001 | Mayo | |
| 6,212,549 B1 | 4/2001 | Page | |
| 6,223,177 B1 | 4/2001 | Tatham | |
| 6,226,748 B1 | 5/2001 | Bots | |
| 6,226,751 B1 | 5/2001 | Arrow | |
| 6,237,020 B1 | 5/2001 | Leymann | |
| 6,282,709 B1 | 8/2001 | Reha | |
| 6,289,511 B1 | 9/2001 | Hubinette | |
| 6,353,926 B1 | 3/2002 | Parthesarathy | |
| 6,378,069 B1 | 4/2002 | Sandler | |
| 6,453,348 B1 | 9/2002 | Barnier | |
| 6,526,456 B1 | 2/2003 | Allan | |
| 6,692,359 B1 | 2/2004 | Williams | |
| 6,697,861 B2 | 2/2004 | Barnier | |
| 6,985,941 B2 * | 1/2006 | Schweitzer et al. | 709/224 |
| 2002/0013841 A1* | 1/2002 | Schweitzer et al. | 709/224 |
| 2002/0013842 A1* | 1/2002 | Schweitzer et al. | 709/224 |
| 2002/0013843 A1* | 1/2002 | Schweitzer et al. | 709/224 |
| 2002/0091811 A1* | 7/2002 | Schweitzer et al. | 709/223 |

OTHER PUBLICATIONS

"AT&T Intranet/Extranet Service", located at http://www.att.net.hk/products/intranet extranet.html, 2 pages, retrieved on Dec. 4, 1997.

"getAccess Data Sheet", located at http://www.encommerce.com/Qublic/Qroducts/docs/gads/resource. html, 1 page, retrieved Aug. 26,1997.

"getAccess Fact Sheet", How Get Access Works, located at http://www.encommerce.com/Qublic/Qroducts/docs/getaccess/getaccess2.html, 3 pages retrieved Aug. 26, 1997.

"getAccess Fact Sheet, Integrated Environment for User Access and Resource Deployment on the Extranet", http://www.encommerce.com/Qublic/Qroducts/docs/getaccess/getaccess.html, 3 pages, retrieved Aug. 26, 1997.

"Harbinger Overview", http://ww.harbinger.com/infoloverview.htm, 7 pages, retrieved on Apr. 6, 1998.

"Intranet to Extranet", http://www.tw2.com/extra.html, 1 page, retrieved on Dec. 4, 1997.

"Open Text Offers Livelink as a Subscription Service", http://newswire.ca/releases/Januarv1998/12/c2081.html, 1 page, retrieved on Apr. 6, 1998.

"Oracle Applications", http://www.oracle.com/groducts/al2l2lications, 2 pages, retrieved on Apr. 6, 1998.

"Overview of Extranet Standards, Extending the Networked Enterprise", http://home.netscaQe.com/comQrod/at work/white QaQer/extranetstds.html, 5 pages, retrieved on Aug. 26, 1997.

"The Rise of the Extranet, Linking Business Partners Via Internet Technology", http://octodav.com/editorial/aoinonline/970235a.html, 2 pages, retrieved on Dec. 4, 1997.

"What IS . . . extranet (a definition)", http://whatis.com/extranet.htm, 1 page, retrieved Aug. 26, 1997.

"What Is . . . intranet (a definition)", http://whatis.com/intranet.htm, 1 page, retrieved Dec. 4, 1997.

"White Paper—Lotus's Internet Applications: Bringing Extensible Business Solutions to the Net", http://www.lotus.com/corocomm/3582.htm, 6 pages, retrieved Aug. 27, 1997.

"White Paper—Notes and Transaction System: mQSeries and CICS Link for Lotus Notes", Integrating Transaction and Client/Server Systems, located at http://www.lotus.com/corocomm/2596.htm, 6 pages, retrieved Aug. 27, 1997.

Adlai-Gail, "Opinion and Outlook: Extra! Extra! Now's the Time to Build an Extranet, It's a Win-Win Tool in Line for Explosive Growth", http://www.otcg.com/html/body build an extranet.html, 2 pages, retrieved on Dec. 4, 1997.

Andreesen, "The Networked Enterprise: Netscape Enterprise Vision and Product", http://home.netscal2e.com/coml2rod/at work/white l2al2er/vision/intro.html, 5 pages, retrieved Aug. 27, 1997.

Bhardwaj, "Re; VPN, Extranet, Internet", http://www.innergy.com/ix/arc/886.html, 1 page, retrieved Dec. 4, 1997.

Fitzloff, "Ameritech Expands EBX Extranet Offerings", InfoWorld, vol. 19, Issue 42, Oct. 20, 1997, 2 pages.

Highleyman, "OL TP Middleware Integrates Client and Server Applications", http://www.xstar.comcarnt/info/olto.html, 4 pages, retrieved Aug. 27, 1997.

Jilovec, "The Role of EDI in Extranets", http://www.midrangesystems.com/Archive/1997/oct1 0/ji101 016.htm, 2 pages, retrieved on Dec. 4, 1997.

NetMinute #405, "Intranet, Internet, Extranet", http://www.netminute.com/NM100405.htm, retrieved on Dec. 4, 1997.

ONESOFT Corporation, "The Extranet Solution, The Business Software Application for the 21st Century", Extranet Components, located at http://www.gxinet.com/scriQtsllAS.DLL?SubSystemID=1&ComQonentID=265, 4 pages, retrieved Aug. 26, 1997.

ONESOFT Corporation, "The Extranet Solution, The Business Software Application for the 21st Century", Sample Extranet Scenarios, located at http://www.gxinet.com/scriQtsllAS.DLL?SubSystemID=1&ComQonentID=263, 5 pages, retrieved Aug. 26, 1997.

ONESOFT Corporation, "The Extranet Solution, The Business Software Application for the 21st Century, Introduction: The Third Wave of Internet Evolution", http://www.gxinet.com/scril2ts/IAS.DLL?SubS~stemID=1 &Coml2onentID=260, 2 pages, retrieved Aug. 26, 1997.

ONESOFT Corporation, "The Extranet Solution, The Business Software Application for the 21st Century, The Extranet", http://www.gxinet.com/scril2ts/IAS.DLL ?SubS~stemID=1 &Coml2onentID=261, 1 page, retrieved Aug. 26, 1997.

Reisman, "Extranets and Intergroupware, A convergence for the next generation in electronic media-based activity", http://www.teleshuttle.com/mediallnterGW.html, 4 pages, retrieved on Aug. 26, 1997.

Reisman, "Extranets and Intergroupware: A convergence for the next generation in electronic", http://www.teleshuttle.com/media/IngerGW.htm, 4 pages, retrieved Aug. 26, 1997.

Reisman, "What's an extranet? and other key terms", http://www.teleshuttle.com/media/extradef, 1 pages, retrieved Aug. 27, 1997.

Tebbe, "Extranets intelligently link intranets", http://www8.zzzdnet.com/Qcweek/oQinion/1111/11 neteff.html, 1 page, Nov. 11, 1996.

Vitro Crop, "Chooses Open Text's Livelink Intranet to Improve Systems Engineering Document Management", http://www.newswire.ca/releases/March1997/26/c5800.html, 2 pages, retrieved on Apr. 6, 1998.

* cited by examiner

FIG. 1

WELCOME <SUBSCRIBER'S NAME>
SELECT THE APPLICATION YOU NEED FOR INSTANT PRODUCTIVITY:

20 — E-MAIL:TALK TO YOUR PARTNERS THROUGH YOUR MAIL BROWSER

22 — FILE TRANSFER SERVER:SHARE FILES WITH PARTNERS NEAR AND FAR.

24 — LIST SERVER:GET YOUR MESSAGE OUT FAST AND EASY

26 — PARTNER DIRECTORY: WHO'S WHO IN YOUR VIRTUAL COMMUNITY

28 — JAVA-BASED OFFICE SOFTWARE: RUN ANYWHERE WORD PROCESSOR, SPREADSHEET, PRESENTATIONS, DATABASE, CONTACT MANAGER, AND FLOW CHARTS

30 — COLLABORATION SUITE: CUT CYCLE TIME WITH PROJECT MANAGEMENT, DISCUSSION GROUPS, WORK FLOW TRACKING, DOCUMENT AND IMAGE LIBRARY, AND BULLETIN BOARDS

32 — ELECTRONIC DATA INTERCHANGE: SELL IT SIMPLY THROUGH INTERACTIVE FORMS

34 — JAVA APPLET VAULT: GET APPLET POWER + FLEXIBILITY WITH SECURITY.

36 — INTERACTIVE COMMERCE ENGINE: SEAMLESS INTERFACE TO LEGACY SYSTEM DATABASES

WEB BASED EXTRANET ARCHITECTURE PROVIDING APPLICATIONS TO NON-RELATED SUBSCRIBERS

CROSS-REFERENCE TO RELATED APPLICATIONS

This application is a continuation of U.S. patent application Ser. No. 10/744,961 filed Dec. 23, 2003, which is a continuation of U.S. patent application Ser. No. 10/246,430 filed on Sep. 17, 2002 now U.S. Pat. No. 6,697,861, which is a continuation of U.S. patent application Ser. No. 09/187,556 filed on Nov. 6, 1998 now U.S. Pat. No. 6,453,348. The disclosures of each of these references are hereby incorporated by reference in their entirety.

FIELD OF THE DISCLOSURE

The present invention is directed to an extra net architecture, and more particularly, to an extra net architecture utilizing Web based technology that provides a large variety of applications to non-related subscribers.

BACKGROUND OF THE DISCLOSURE

Various forms of intranets have provided companies with intraoffice communications for some time. An intranet may be defined as a private application of the same internetworking technology, software and applications within a private network for use within an organization. It may be entirely disconnected from the public Internet or it may be linked to it and protected from unauthorized access by security systems. Such known networks are commonly called "intraoffice" networks because they only allow communications within an organization.

Other networks, often referred to as "extranets" or private internets allow communications and application sharing between designated, non-related organizations. Extranets are generally closed networks that allow communications between designated parties. Various types of "extranet" architectures are known. One type of extranet architecture is often referred to as a shared private network where the organizations that have access to the network are enumerated and often a third party is in charge of updating the list of enumerated users and managing passwords. One such type of shared private network between two organizations, for example, a shipping dock and receiving dock, may be linked to exchange information regarding orders. This is generally the oldest type of extranet. Such extranets have also been used for electronic data interchange (EDI) and involve coupling two organizations through a third party provider using typically XO.25 protocols and not necessarily using Internet Protocols ("IP"). This type of extra net architecture has certain disadvantages. For one, the connection is for a specific purpose and thus has very limited application. Second, only a limited number of an organization's business partners have reason to connect in this manner. Third, typically lower data communications and lack of IP capabilities limit the general usefulness of such configurations.

Another type of extranet architecture couples a plurality of nonrelated organizations together with appropriate routing and traffic management capabilities. The organizations may communicate with one another and share various applications. Some implementations are managed by one business partner. This obviously has the drawback that such a system is expensive to implement and particularly burdensome for one party to maintain. While cost-sharing arrangements may be created, one part must still consume the same organizational resources needed to maintain a network for others. While these types of extra nets provide good security, they lack the bandwidth to accommodate a large number of applications. Other types of extranets utilize the Internet which provides increased bandwidth but lacks the security of shared private networks. One such type of network which couples organizations through the Internet is referred to as a virtual private network. The variety of virtual private network extranet utilizes facilities of one or more Internet service providers combined with the user's own VPN software instead of setting up a dedicated private network. In order to maintain a level of security, communications over the Internet must be encrypted. A main difference between a virtual private network extranet and the Internet, in general, is that for a virtual private network extranet access is encrypted and limited to designated organizations and/or individuals rather than the world at large. Of course in selecting a particular extranet architecture, the benefits in cost savings must be weighed against security risks.

It is thus desirable to provide an extranet architecture coupled to a wide diversity of applications that may be shared by non-related organizations while eliminating the need for any one organization to maintain the available applications. It is also desirable to provide an extranet architecture that provides an appropriate degree of security and privacy. It is furthermore desirable to provide an extranet architecture that is flexible and can be easily modified and updated.

BRIEF SUMMARY

According to a first aspect of the embodiments, there is provided a method for providing an extranet service between at least two subscribers. The method includes the steps of: interconnecting the plurality of subscribers by digital data circuits to form an extranet; coupling a server to the extranet wherein the server stores a plurality of applications and data including collaboration software, office productivity software, and electronic data interchange software; loading at least one of the plurality of applications onto the extranet for use by the plurality of subscribers in response to a request by a subscriber for a particular application.

According to a second aspect of the embodiments, there is provided a method for providing an extranet service between subscribers. The method includes the steps of: (a) establishing a subscriber database listing customers who subscribe to the extranet service; (b) establishing a communication link between the subscribers listed in the subscriber database to form an extranet; (c) providing collaboration software applications on the extranet; (d) providing workflow software applications on the extranet; (e) providing transaction software applications on the extra net; (f) providing electronic mail software applications on the extra net; (g) providing electronic data interchange software applications on the extranet; (h) sharing the software application provided in steps (b)-(g) among the subscribers listed in the subscriber database.

According to a third aspect of the embodiments, there is provided a method for providing an extranet service between customers, the method comprising the steps of: (a) establishing a communication link between customers to form an extra net; (b) providing workgroup software on the extra net; (c) providing transaction software on the extra net; (d) providing security software on the extranet; (e) providing transport software; (f) sharing the software provided in steps (b)-(e) to the customers on the extranet.

According to a fourth aspect of the embodiments, there is provided an extranet including a network coupling a plurality of non-related participants wherein each participant is located remotely from the other participants, and a server coupled to the network, the server storing a plurality of applications including workgroup applications, transaction applications, security applications and transport applications wherein the server is programmed to load particular ones of the plurality of applications onto the network for use by the plurality of participants in response to a request by one of the plurality of participants.

DETAILED DESCRIPTION OF THE DRAWINGS

Figure 1:
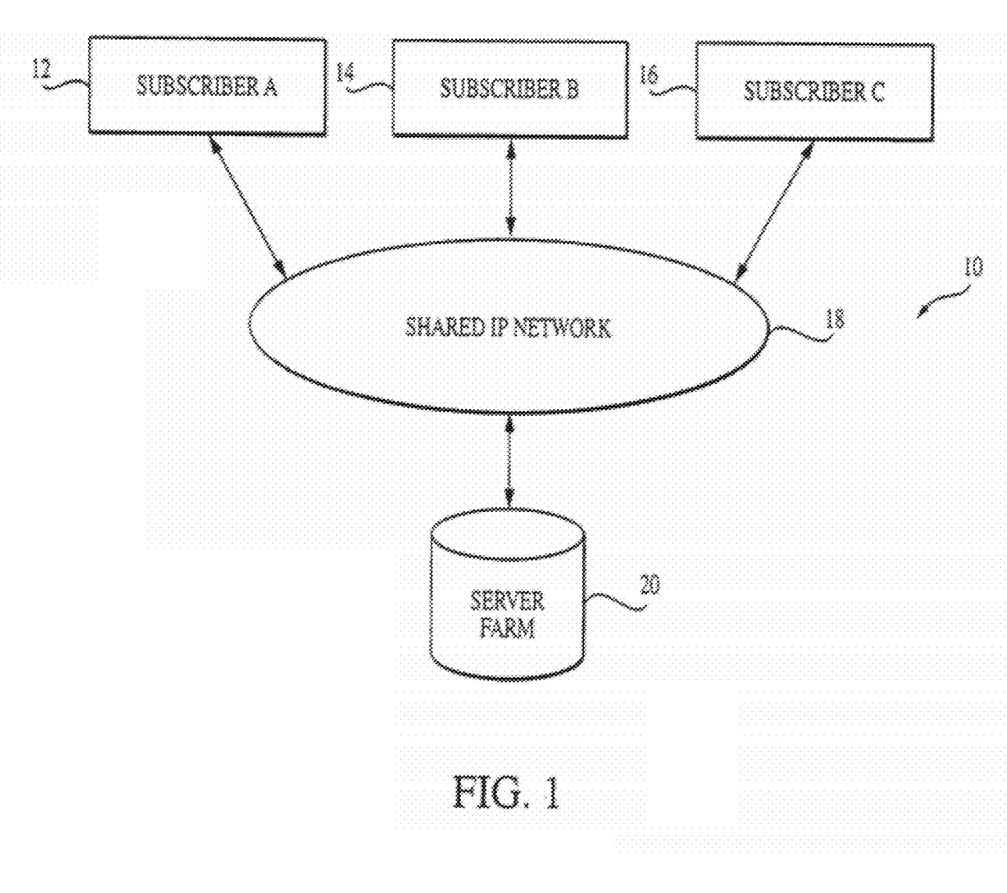
FIG. 1 is a schematic illustration of an extranet architecture according to a preferred embodiment of the present invention.

FIG. 1 is a schematic illustration of an extranet architecture according to a preferred embodiment of the present invention. The architecture 10 includes generally a plurality of subscribers 12, 14, 16; a shared network 18 utilizing Internet Protocol ("IP"), and a server farm 20. As shown, the shared network 18 couples the plurality of subscribers to the server farm 20. While the various components will be described in detail hereinafter, in general the server farm 20 is an interconnected grouping of storage devices that stores a multitude of applications and databases, for example, on redundant disks as will be described hereinafter.

In general, the subscribers are non-related entities, for example, different companies and/or organizations, or individuals. A subscriber on the shared network 18 may have access to some or all of the applications and data available on the server farm 20 through their network connection. Access for an individual user would be determined by what applications the user or user's organization has subscribed to; the access granted to data and applications granted by the user's organization; and the access granted to particular data files by owners of those files. This could mean access to a server-based application through a client's browser or distributing, updating and connecting a client/server application. In a preferred embodiment, Web browser technology is used to present each subscriber with a menu of applications from which they may choose merely by clicking on a particular icon displayed on a display unit (not shown).

Figure 2:
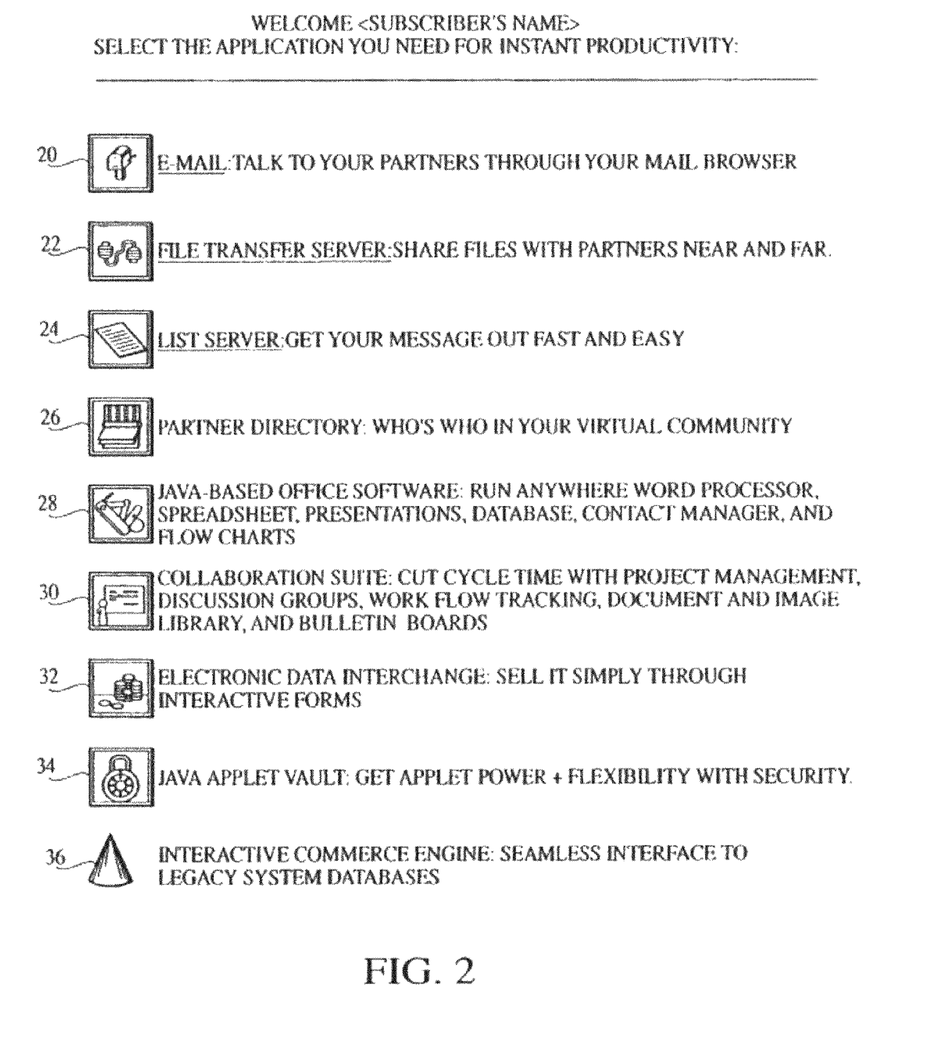
FIG. 2 is an example of a screen menu that can be displayed on a subscriber's display.

Shown in FIG. 2 is an example of a screen menu that can be displayed on a display of a subscriber's computer, for example. Illustrated are various menu icons that represent applications available to the subscriber from which the subscriber can select merely by clicking on a menu icon. The selection of applications is intended to be illustrative and not limiting. It will be appreciated that future upgrades may replace or eliminate applications illustrated while adding new ones. For example, icon represents an electronic mail application which allows subscribers to communicate with one another over the extranet. Icon 22 represents a file transfer server application that allows subscribers to share files over the extranet. Icon 24 represents a list server application that allows subscribers to create address groups so that electronic messages can be created simply and efficiently. Icon 26 represents a partner directory that lists subscribers on the extranet. Icon 28 represents Java-based office applications which provide word processor, spreadsheet, presentations, database applications. Icon 32 represents a collaboration suite application which includes project management, discussion groups, work flow engine, document and image library and bulletin board applications. Icon 34 represents an electronic data interchange (EDI) application. This would enable low-volume EDI users to enter transactions into a Web page or enable medium-volume users to send transactions by secure EDI-MIME type e-mail. Icon 36 represents a Java applet vault application to provide, store and verify digital certificates for Java applets shared by subscribers. Of course more applications may be added to the server farm. While FIG. 2 illustrates particular applications, a subscriber's access to certain applications may be limited and not all of the subscribers may have access to all of the applications based on the user's security profile.

Figure 3:
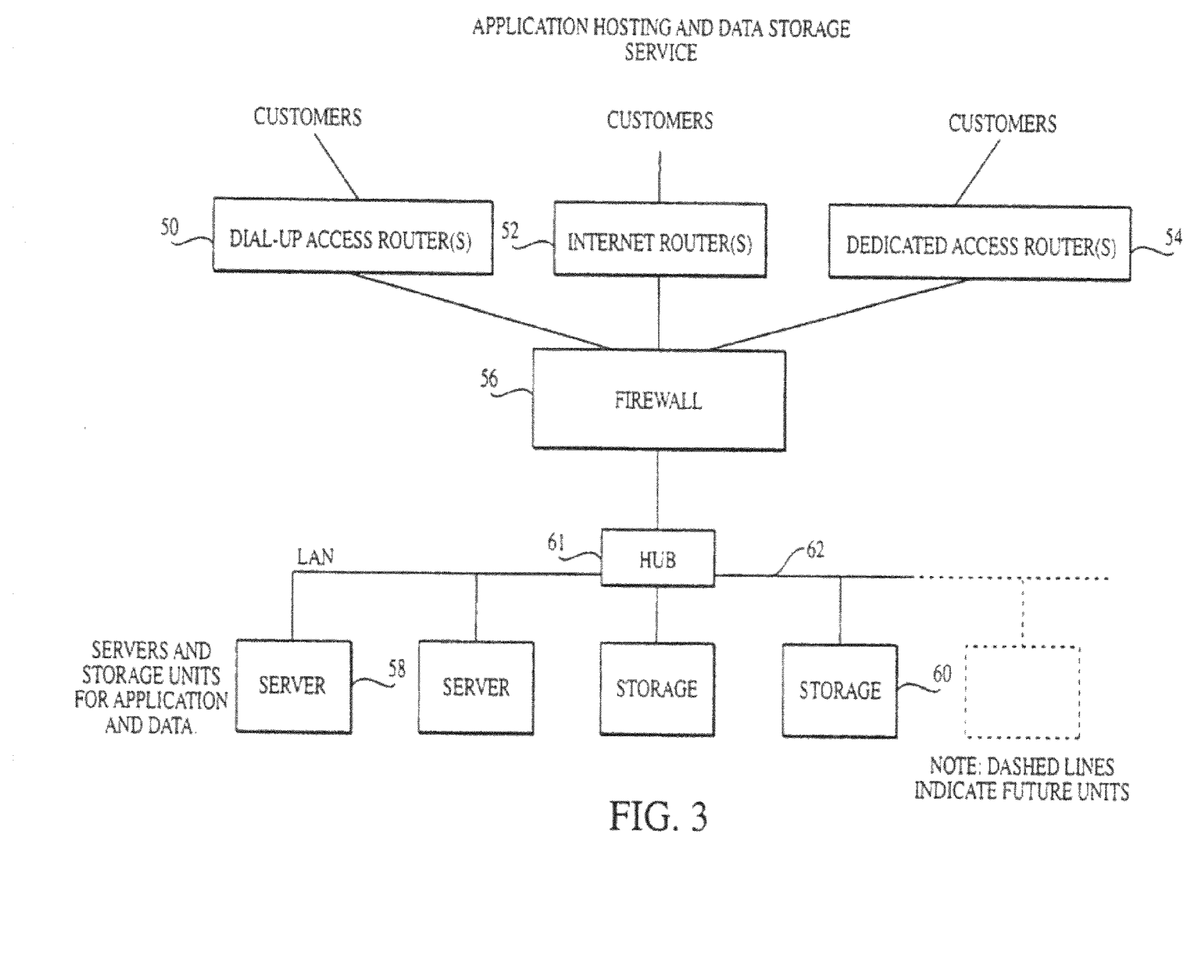
FIG. 3 is a more detailed schematic block diagram of the extranet architecture shown in FIG. 1 according to a preferred embodiment of the present invention.

FIG. 3 is a more detailed schematic block diagram of the extranet architecture shown in FIG. 1 according to a preferred embodiment of the present invention. Three subscribers 12, 14 and 16 are illustrated, but, of course there may be more or less. In addition, the term "subscriber" is used to refer to non-related entities, i.e., two companies, for example. Each subscriber may have its own intranet coupling various of its organizations, for example, in the form of a local area network although the present invention is not limited to subscribers having local area networks and individuals having a workstation may also be subscribers. While only three subscribers are shown it will be appreciated that many more subscribers can be coupled together with the extranet architecture according to the present invention. The shared network 18 includes various routers, and more particularly, dial-up access routers 50, Internet access routers 52 and dedicated access routers 54 that provide the subscribers with various options for accessing the shared network 18 as will be described in greater detail hereinafter.

Security may be provided in various ways such as by what is commonly referred to as a firewall 56, one time passwords, encryption programs, digital certificates and user application security, for example. Various combinations of these security features may be used. In a preferred embodiment, these security approaches would be layered to provide a highly secure environment in which subscribers can share ideas and information. Encrypting may be accomplished by the use of virtual private networking technology or other technologies that evolve. In addition, security can be administered at the network, application, application module and user file levels to continually update needed profile information. The server farm 20 includes at least one application server 58 and a plurality of storage units 60 coupled together and to the firewall 56 by a hub 61 and local area network 62, for example. The number of storage units 60 will of course depend upon the number of applications provided and amount of user data stored on the server farm 20.

Figure 4:
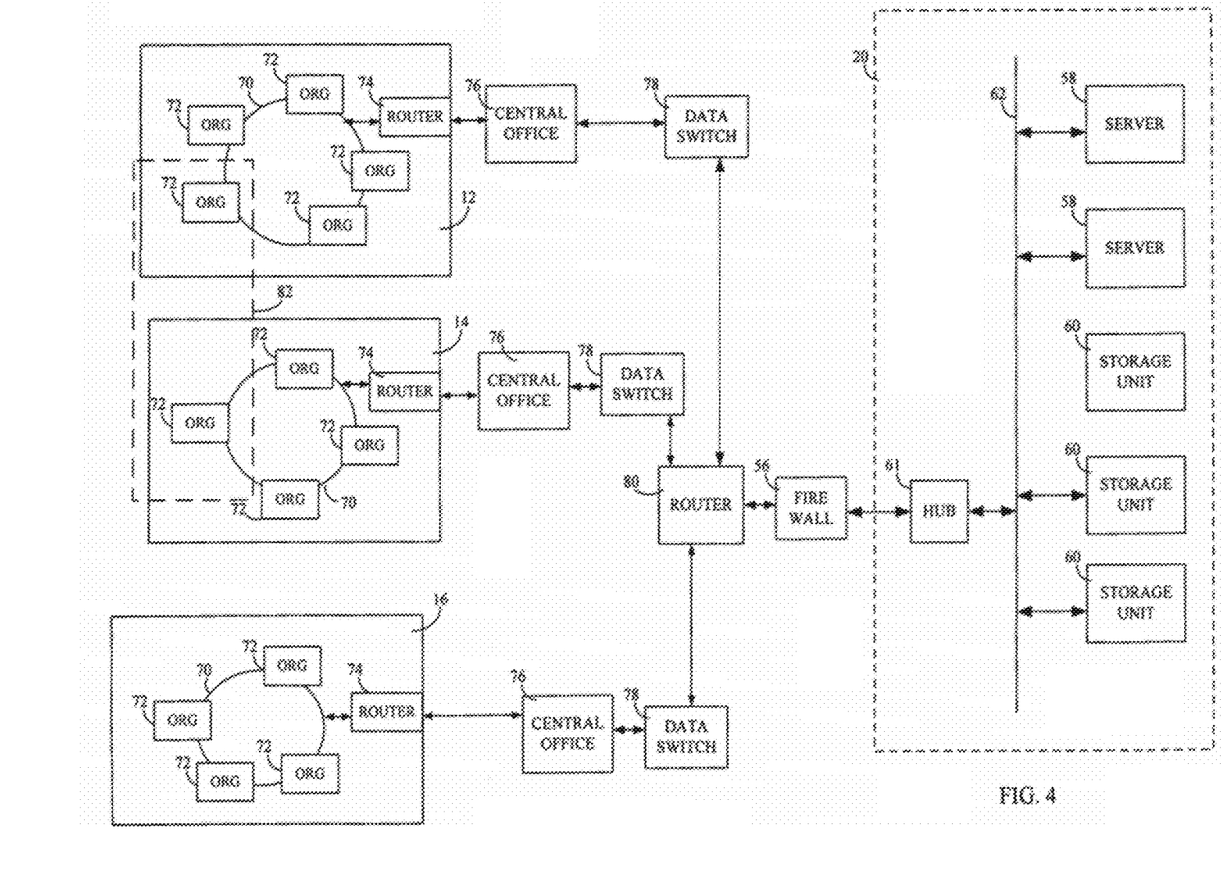
FIG. 4 is a still more detailed schematic block diagram of the extranet architecture shown in FIG. 1 according to a preferred embodiment of the present invention.

FIG. 4 is an even more detailed schematic block diagram of the extranet architecture shown in FIG. 1 according to a preferred embodiment of the present invention. Shown in FIG. 4 are subscribers 12, 14 and 16. Each subscriber may have its own intranet architecture 70 coupling its various organizations 72 which can be located at various geographic sites to one another. Alternatively, a subscriber may be one individual located at a standalone work station. Each subscriber accesses the extranet architecture through a router 74. As previously mentioned, the subscribers have various options for accessing the extranet architecture according to the present invention including analog or ISDN dial-up access or dedicated access using ATM, SMDS or frame relay protocols. FIG. 4 does not illustrate in detail the architecture for accessing the extranet architecture according to the present invention since those are well known to those of ordinary skill the art. Typically a PSTN central office 76 and a data network provider switch site 78 as well as an additional router 80 couple each subscriber to the firewall 56. In a preferred embodiment an additional router 80 is coupled to the firewall 56 by an Ethernet link. In a preferred embodiment a redundant additional router (not shown) would be provided as a back-up to additional router 80. The server farm 20 includes the hub 61, local area network 62, application servers 58 and storage units 60.

The operation of the extranet will now be described in detail. Various non-related subscribers are coupled to server farm 20 by access routers. The non-related subscribers are able to access applications and data stored by the application servers 58 and storage units 60 although access of some applications and/or data may be restricted based upon security concerns.

The present invention allows non-related entities to collaborate with one another in a simple, flexible manner without requiring any particular subscriber to maintain the integrity or currentness of the extranet. For example, company A may be working with non-related company B on the production of a part and require a logical project extranet 82 to be created between them. By using the extranet according to the present invention, companies A and B may securely exchange email, participants in discussion for a collaboratively work on documentation, spread sheets, workflow schedules, etc. Importantly, the communications and data exchanged between companies A and B are secured from access by other subscribers on the extranet. Thus subscribers can flexibly add or delete subscribers on the extranet according to their needs. In addition, each subscriber has access to a large number of applications without having to maintain such applications. Thus, a communication link is established between the subscribers listed in a subscriber database by establishing appropriate routing tables within an established security policy.

Returning to FIG. 2 the various applications illustrated in the menu screen are commercially available products which may be used in the present invention. It will be appreciated that applications will be upgraded and new applications added and older ones deleted as the technology develops. For example, Livelink Intranet available from Open Text Corp of Toronto, Ontario Canada may be used as a collaboration software application. The Express and Trusted Link products from Harbinger Corp. of Atlanta, Ga. may be used for an electronic data interchange application software.

Figure 5:
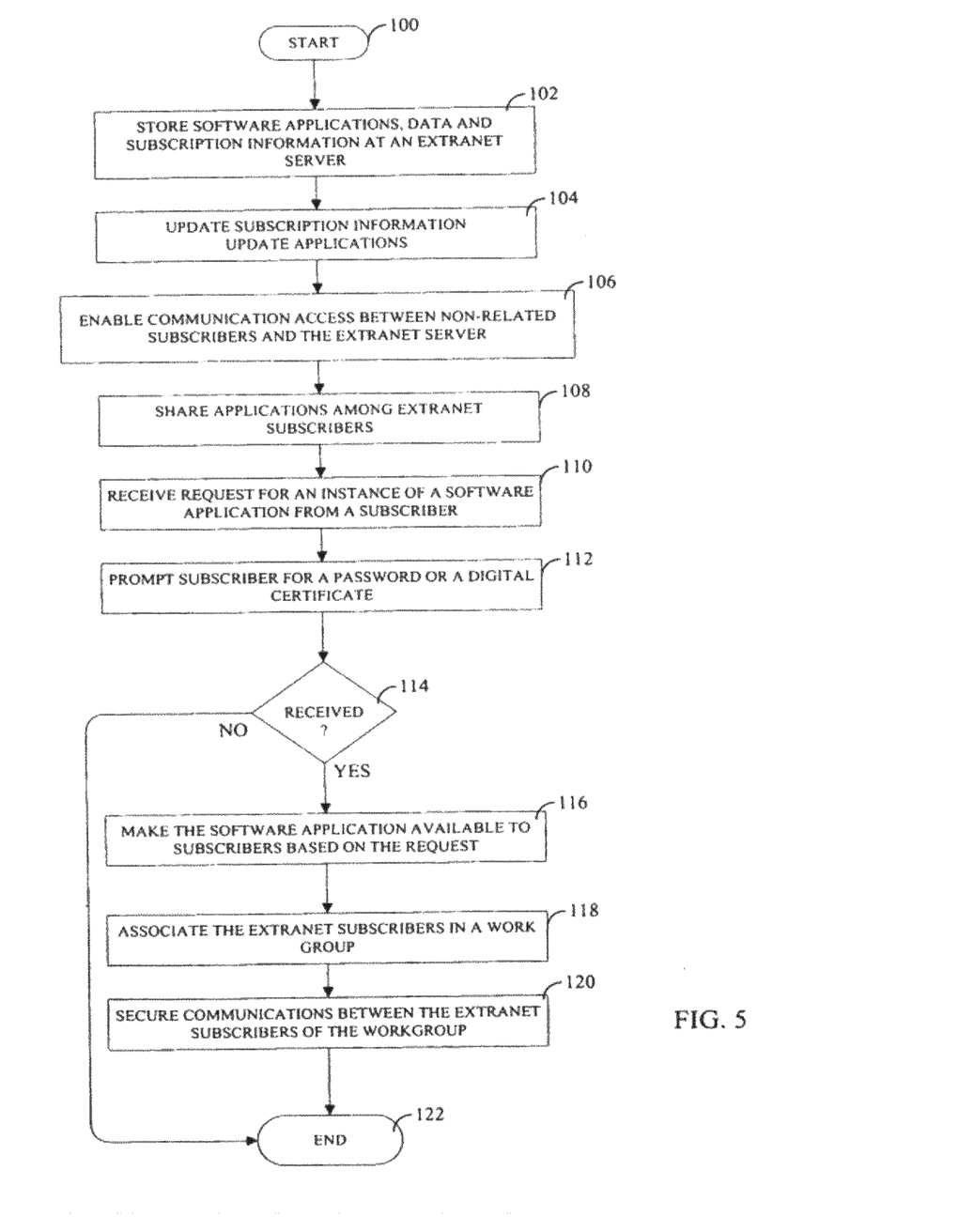
FIG. 5 illustrates an extranet method for providing extranet subscribers with access to software applications.

FIG. 5 illustrates an extranet method for providing extranet subscribers with access to software applications. The method begins at block 100. At block 102, an extranet server stores software applications, data and subscription information for extra net subscribers. At block 104, updates are performed on the stored information, including updating the subscription information and updating the stored applications. At block 106, communication access is enabled between non-related subscribers and the extra net server. At block 108, applications are shared among the extranet subscribers'. At block 110, a request is received from a subscriber for an instance of a software application. At block 112, to ensure security, the subscriber is prompted for a password or a digital certificate. At block 114, if the correct response to the security prompt is not received, the method ends. Otherwise, at block 116, the software application is made available to subscribers based on the request. At block 118, the extranet subscribers are associated in a work group, such as logical project extranet 82 illustrated in FIG. 4. At block 120, communications are secured between the extranet subscribers of the workgroup so that that the communications and data exchanged are not available to other subscribers. The workgroup proceeds in operation and the method ends at block 122.

The foregoing description of the preferred embodiments of the present invention have been presented for purposes of illustration and description. It is not intended to be exhaustive or to limit the invention to the precise form disclosed. Many modifications and variations will be apparent to practitioners skilled in the art.

Furthermore, the preferred embodiments of the present invention would be customer driven in the applications hosted. Therefore, customers could suggest applications to include on the servers. For example, different subscribers using common computer aided design (CAD) software could request the inclusion on the servers of a file library developed by their CAD software vendor.

Similarly, any process steps described might be interchangeable with other steps in order to achieve the same result. The embodiments were chosen and described in order to best explain the principles of the invention and its practical application, thereby enabling others skilled in the art to understand the invention for various embodiments and with various modifications as are suited to the particular use contemplated.

What is claimed is:

1. A server comprising:
a memory to store instructions; and
a controller coupled to the memory, wherein responsive to executing the instructions, the controller performs operations comprising:
communicating data over a network to facilitate establishment of a virtual extranet community among a plurality of communication devices associated with a plurality of entities and to facilitate establishment of secure communications within the virtual extranet community, wherein the plurality of entities are unrelated; and
providing access for the plurality of communication devices to a software application that enables managing contact information for the plurality of entities, managing messages provided in the virtual community and managing collaborative sharing of documents,
wherein the access is based on the plurality of communication devices being associated with a workgroup defined from among the plurality of communication devices associated with the plurality of entities, and
wherein the secure communications comprise first communications between an entity router of each of the plurality of entities communicatively coupled to a network router remotely located from each of the plurality of entities, and second communications between the network router and the server via a firewall remotely located from each of the plurality of entities.

2. The server of claim 1, wherein the software application enables managing of projects and defining of workgroups.

3. The server of claim 2, wherein the network is an internet protocol network, and wherein the workgroup is defined by a communication device of the plurality of communication devices utilizing the software application.

4. The server of claim 1, wherein the software application facilitates transactions between the plurality of communication devices.

5. The server of claim 1, wherein the software application enables the plurality of communication devices to retrieve information from a database.

6. The server of claim 5, wherein the database comprises a legacy database.

7. The server of claim 1, wherein the operations further comprise obtaining a security profile to provide the access for the plurality of communication devices to the software application, wherein the security profile defines an association for the plurality of entities with the workgroup.

8. The server of claim 1, wherein the operations further comprise accessing a security policy to facilitate the establishment of the secure communications in the virtual extranet community, wherein the security policy comprises a routing table defining a secure communication link between the plurality of communication devices associated with the workgroup.

9. The server of claim 1, wherein the operations further comprise enabling access for the plurality of communication devices to a common display menu for selecting the software application.

10. The server of claim 1, wherein the operations further comprise limiting access for the plurality of communication devices to data files based on permission from an entity associated with the data files.

11. A non-transitory computer-readable storage medium comprising instructions which, when executed by a processor, cause the processor to perform operations comprising:
providing access for a plurality of communication devices associated with a plurality of entities to a server system, wherein the access is provided over a data network which communicates data in accordance with an internet protocol to facilitate establishment of a virtual extranet community among the plurality of communication devices for secure communications,
wherein the plurality of entities are unrelated, and
wherein the secure communications comprise first communications between an entity router of each of the plurality of entities communicatively coupled to a network router remotely located from each of the plurality of entities, and second communications between the network router and the server via a firewall remotely located from each of the plurality of entities;
obtaining workgroup information that identifies workgroup communication devices from among the plurality of communication devices that are associated with a workgroup; and
providing access for the workgroup communication devices to a software application that enables collaborative sharing of documents, wherein the access to the software application is based on the workgroup communication devices being associated with the workgroup.

12. The non-transitory computer-readable storage medium of claim 11, wherein the software application enables the workgroup to be defined by a communication device of the plurality of communication devices.

13. The non-transitory computer-readable storage medium of claim 11, wherein the software application enables managing contact information for the plurality of entities.

14. The non-transitory computer-readable storage medium of claim 11, wherein the software application enables managing messages provided in the virtual extranet community.

15. The non-transitory computer-readable storage medium of claim 11, wherein the operations further comprise enabling access for plurality of communication devices to a common display menu for selecting the software application.

16. The non-transitory computer-readable storage medium of claim 11, wherein the operations further comprise obtaining security information to facilitate the secure communications in the virtual extranet community, wherein the security information comprises a routing table defining a secure communication link between the plurality of communication devices.

17. A server comprising:
a memory to store instructions; and
a controller coupled to the memory, wherein responsive to executing the instructions, the controller performs operations comprising:
communicating data over a network to facilitate establishment of a virtual extranet community among a plurality of communication devices associated with a plurality of entities and to facilitate secure communications over the network between the plurality of communication devices,
wherein the plurality of entities are unrelated, and
wherein the secure communications comprise first communications between an entity router of each of the plurality of entities communicatively coupled to a network router remotely located from each of the plurality of entities, and second communications between the network router and the server via a firewall remotely located from each of the plurality of entities; and
providing access for the plurality of communication devices to a software application that enables managing collaborative sharing of documents,
wherein the access to the software application is based on the plurality of communication devices being associated with a workgroup defined from among the plurality of communication devices associated with the plurality of entities.

18. The server of claim 17, wherein the software application enables managing of projects and defining workgroups, wherein the network is an internet protocol network, and wherein the workgroup is defined by a communication device of the plurality of communication devices utilizing the software application.

19. The server of claim 17, wherein the operations further comprise enabling access for the plurality of communication devices to a common display menu for use of the software application, and wherein the software application enables managing contact information for the plurality of entities and managing messages provided in the virtual community.

20. The server of claim 17, wherein the operations further comprise accessing a security policy to facilitate the secure communications in the virtual extranet community, wherein the security policy comprises a routing table defining a secure communication link between the plurality of communication devices associated with the workgroup.

* * * * *